(12) United States Patent
Feierbach et al.

(10) Patent No.: US 7,796,139 B1
(45) Date of Patent: Sep. 14, 2010

(54) METHODS AND APPARATUS FOR DISPLAYING A FRAME WITH CONTRASTING TEXT

(75) Inventors: Gary F. Feierbach, Belmont, CA (US); John Bates, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1109 days.

(21) Appl. No.: 11/054,890

(22) Filed: Feb. 9, 2005

Related U.S. Application Data

(62) Division of application No. 10/448,506, filed on May 29, 2003, now Pat. No. 7,064,759.

(51) Int. Cl.
 *G09G 5/02* (2006.01)
(52) U.S. Cl. .................. 345/589; 345/581; 345/639; 345/643; 345/469.1; 345/470; 382/167; 382/168; 382/171; 382/199
(58) Field of Classification Search .............. 345/469.1, 345/470
See application file for complete search history.

(56) References Cited

U.S. PATENT DOCUMENTS

| | | | | |
|---|---|---|---|---|
| 5,270,806 A | * | 12/1993 | Venable et al. .............. | 358/500 |
| 5,861,871 A | * | 1/1999 | Venable ...................... | 708/200 |
| 6,411,730 B1 | * | 6/2002 | Bartell et al. ............... | 382/168 |
| 6,518,981 B2 | * | 2/2003 | Zhao et al. .................. | 715/764 |
| 6,686,923 B2 | * | 2/2004 | Ji et al. ....................... | 345/606 |

OTHER PUBLICATIONS

Definition of Frame, found at website address: http://searchnetworking.techtarget.com/sDefinition/0,,sid7_gci212152,00.html accessed Mar. 31, 2003.
Definition of RGB, found at website address: http://whatis.techtarget.com/definition/0,,sid9_gci212900,00.html accessed Mar 31, 2003.
Definition of Palette, found at website address: http://searchwebservices.techtarget.com/sDefinition/0,,sid26_gci212740,00.html accessed Apr. 1, 2003.
Color Representation, found at website address: http://www.netnam.vn/unescocourse/computervision/12.htm accessed Apr. 1, 2003.

* cited by examiner

*Primary Examiner*—Antonio A Caschera
(74) *Attorney, Agent, or Firm*—Beyer Law Group LLP

(57) ABSTRACT

Mechanisms for displaying text or image over a background such as a video display frame that automatically improve legibility of text or image displayed against a background by increasing the contrast between text or image and background. The display frame may be a single image, but may also be an image within a dynamic sequence of recorded images such as a movie or other video media, or sequence of images captured in real-time by a camera or other device. In one embodiment, color component values are selected, and complementing and filtering applied to achieve contrast. In another embodiment, selecting a minimally used value for color components in the frame achieves contrast. In some cases both text or image, and background, may be altered to achieve contrast. Another embodiment provides background intensity modulation to achieve varying contrast within altered backgrounds, and smoothing over many frames in dynamic material.

15 Claims, 9 Drawing Sheets

| Intensity range (e.g., Y) | Color Range (e.g., Cr, Cb) | Complemented intensity (and optional color value(s)) |
|---|---|---|
| 0.0-0.3 | 0.0-0.5 | 1.0 |
| 0.31-0.5 | 0.0-.05 | 1.0 |
| 0.51-0.8 | 0.0-0.5 | 1.0 |
| 0.81-1.0 | 0.0-0.5 | 0.8 |
| 0.0-0.3 | 0.51-1.0 | 0.0 |
| 0.31-0.5 | 0.51-1.0 | 0.0 |
| 0.51-0.8 | 0.51-1.0 | 0.0 |
| 0.81-1.0 | 0.51-1.0 | 0.8 |

METHODS AND APPARATUS FOR DISPLAYING A FRAME WITH CONTRASTING TEXT

RELATED APPLICATIONS

This application is a divisional application and claims priority of U.S. patent Ser. No. 10/448,506, entitled "Methods and Apparatus for Displaying a Frame with Contrasting Text," filed on May 29, 2003 now U.S. Pat. No. 7,064,759, naming Feierbach et al. as inventors, which is incorporated herein by reference for all purposes.

FIELD OF THE INVENTION

The present invention relates generally to displaying text or an image and, more specifically, to increasing the visibility of the text or image against a background over which the text or image is displayed.

BACKGROUND OF THE INVENTION

There are many instances in which text is displayed against a background. For instance, text is often presented on static media or frames such as slides in order to explain or describe associated figures or photographs. Similarly, text is often displayed in dynamic media such as movies in the form of subtitles or credits.

Text is also displayed in various real-time applications. For instance, heads-up displays are being developed which enables text to be viewed through a transparent display (e.g., LCD) or projected onto a reflective medium. Other recent technological developments include computer-assisted surgery in which text is displayed adjacent to or over an area of an individual being operated upon.

The background area over which text is to be displayed typically impacts the attractiveness and legibility of the text placed over the background. Unfortunately, the characteristics of the background area are typically not considered when displaying text over a background area. In fact, conventional methods of displaying text consist of displaying black or white lettering. Thus, such methods are undesirable in instances where the background color and intensity result in a minimum contrast between the background and the text overlaying the background.

In view of the foregoing, there is a need for mechanisms for displaying text over a background that improve the legibility of the text that is displayed against the background.

SUMMARY OF THE INVENTION

These and other features and advantages of the present invention will be presented in more detail in the following specification of the invention and the accompanying figures, which illustrate by way of example the principles of the invention.

Methods and apparatus for displaying text (and/or an image) within a frame are disclosed. Text may be presented in a variety of scenarios, such as for the purpose of displaying movie subtitles, voltages or test point names. An image may include an icon, a waveform generated by an oscilloscope, pattern, schematic, block diagram, graphics, photographic image, or a museum scene. This may be accomplished by altering the text/image and/or associated border to increase the contrast between the text/image and the background of the frame over which the text/image is displayed. Alternatively, the background of the frame may be altered in order to increase the contrast between the background and the text/image that is displayed.

In order to simplify the following description, methods of displaying text are described. However, the same methods may also be performed to increase the contrast between an image and a background over which the image is displayed. Moreover, the term "background" is used to refer to any two dimensional surface or three dimensional object. For instance, the two dimensional surface may be transparent (e.g., window) or opaque (e.g., movie projection screen, display on electronic equipment or road surface). The three dimensional object may be an inanimate object (e.g., machinery) or an animate object (e.g., person or animal). Displaying may be performed in a variety of ways, including but not limited to, projection.

In accordance with one aspect of the invention, the contrast between the text and background of the frame is increased by selecting one or more color component values for use in generating the text (and/or associated border). The text may also include an optional border surrounding and adjacent to the text. One or more color component values (e.g., Y, Cr, and/or Cb) in a color component format (e.g., YcrCb, RGB, or RGBA) are then selected for use in generating the text and/or associated border. In order to increase the contrast between the text and the background area of the frame, the color component value(s) are selected through applying both a (a) complementing process and (b) filtering process. Specifically, a complement of one or more color component values associated with one or more pixels of the frame are determined. The term "complement" will hereinafter refer to a value that is approximately opposite, or maximally or substantially different, from the value being complemented. The complement is preferably obtained from an average (e.g., filtered) color component value over a set of pixels in the frame (e.g., pixels within the area of the frame in which the lettering is to be displayed). Of course, the complement may be obtained directly for each of a set of pixels in the frame from which an average value may then be obtained. In other words, the complementing and filtering processes may be performed in either order. The complemented and averaged color component value(s) may then be used to generate text and/or an associated text border. In accordance with another embodiment, rather than applying a complementing or filtering process, a minimally used value for one or more color components within a set of pixels in the frame is used to generate the text (and/or associated text border).

In accordance with another aspect of the invention, the contrast between the text and background of the frame is increased by selecting one or more color component values for use in displaying at least a portion of the frame (e.g., background over which the text is displayed). In other words, one or more color component values in at least a portion of pixels in the frame are modified to provide a greater contrast between the text and/or associated border to be generated within that frame. For instance, a darkening or lightening of selected pixels of the frame may increase the contrast between the text and the background pixels. In one embodiment, the lightening or darkening is performed as a function of the distance from the text and/or associated border. In other words, the lightening or darkening decreases as the distance from the lettering increases, resulting in the greatest contrast at the text or associated border.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Figure 1A:
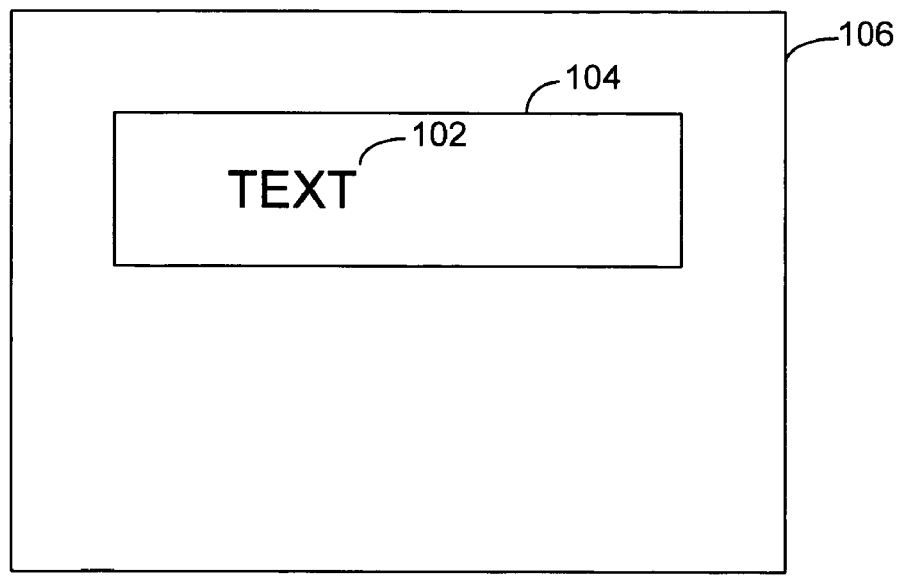
FIG. 1A is a diagram illustrating text (e.g., lettering) generated in accordance with various embodiments of the invention.

FIG. 1A is a diagram illustrating text (e.g., lettering) generated in accordance with various embodiments of the invention. As shown, text 102 is generated within a text box area 104 of a frame 106. Various methods for generating the text will be described in further detail below that provide a greater contrast between the text and background pixels of the frame over which the text is displayed. In general, the values of one or more color components of various pixels in the frame in which the text is to be displayed are considered in order to ascertain an appropriate value for those same color component(s) for the text that is generated within the frame. Alternatively, the value of one or more color components may be altered in various background pixels of the frame in order to display text that is black, white or another color, thereby increasing the contrast between the text and the background of the frame. The color and/or intensity of the text may be considered when altering the background pixels of the frame. For instance, when the color of the text to be displayed is white, the background pixels of the frame may be darkened. Alternatively, when the color of the text to be displayed is black, the background pixels of the frame may be lightened.

Figure 1B:
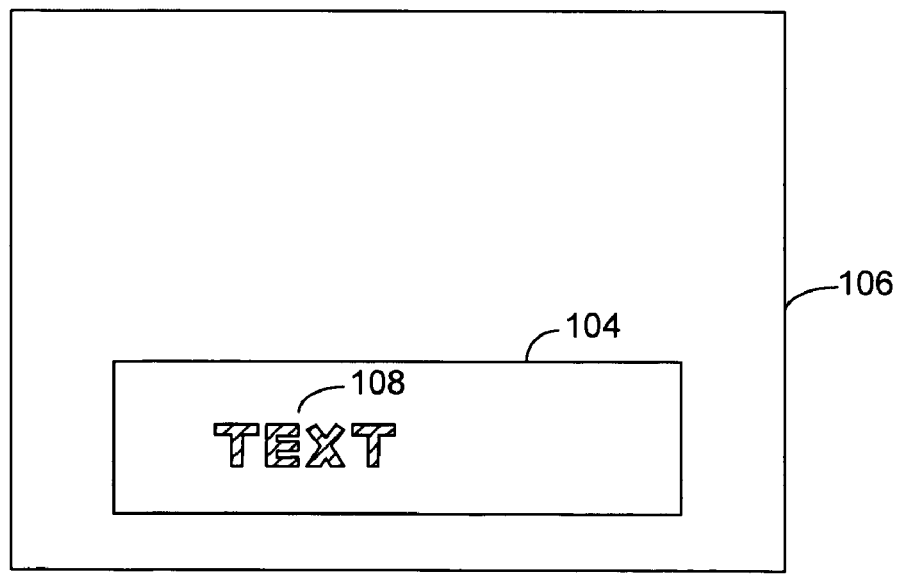
FIG. 1B is a diagram illustrating text (e.g., lettering) bordering generated in accordance with various embodiments of the invention.

Text may also be generated with a "border." FIG. 1B is a diagram illustrating text (e.g., lettering) bordering generated in accordance with various embodiments of the invention. In this example, the text 108 is outlined with a border that is adjacent to and surrounds the text. Specifically, the text color and intensity are represented by diagonal lines, while the border surrounds the text. The color of the text may be specified as a default value or a user-specified value. In order to provide sufficient contrast between the text and the background of the frame, the values of one or more color components of various pixels in the frame over which the text and border are to be displayed are considered in order to ascertain an appropriate value for those same color component(s) for the border. Alternatively, the value of one or more color components may be altered in various background pixels of the frame in order to display the text and border with sufficient contrast. Specifically, the color (and intensity) of the border may be considered when altering the background pixels of the frame.

In the following description, the term "frame" will be used to refer to a single image. For instance, a frame may be an image in a sequence of images that are recorded, such as a movie or videotape. In computer video display technology, a frame is the image that is sent to the display image rendering device. The frame is therefore referred to as digital information that is either represented initially as digital information, or captured by a camera or other device in real-time for use in generating text in accordance with various embodiments of the present invention. The text and optional border are then displayed within or over the frame. In real-time applications, text and border display may be accomplished via projection onto a surface or through a transparent medium.

A frame is generally represented by a plurality of pixels. The pixel information is represented by a set of color components. Various formats may be used to represent pixel information. For instance, the RGB (red, green, and blue) format requires that each pixel has a red, a green, and a blue component. Other formats include, but are not limited to, CMY (cyan, magenta, and yellow), CMYK (cyan, magenta, yellow, and black), HSI (hue, saturation, and intensity), and YCbCr, which separates the luminance from the color information. In other words, the Y component represents the intensity of the pixel, while Cb and Cr are used to represent the blue and red color components.

In the following description, the pixel information will be represented in YCbCr format. The possible value ranges of Y, Cr and Cb are 16-235, 16-240, and 16-240, respectively. In order to simplify the following discussion, these ranges will be treated as normalized between 0 and 1 and represented by the interval [0,1]. However, it is important to note that various formulas are known to those of ordinary skill in the art that may be used to transform pixel information from one color representation to another.

The pixel information is obtained in real-time or from a database. Specifically, the pixel information comprises a value for one or more color components for a set of pixels. For instance, the pixel information may comprise information for the Y value for each of a set of pixels, and may also include information for the Cr and Cb values. When the present invention is to be applied to single frame pictures and presentations or dynamic material such as movies and videos, the pixel information is preferably obtained from a database or other storage medium. However, where the information is to be obtained and applied in real-time heads-up displays for use in civilian or military applications such as medical applications or vehicles (e.g., cars, planes), a camera or other device may be used to capture pixel information in real-time. The text and/or surrounding text border may then be displayed or projected onto an opaque, reflective, or transparent surface. Exemplary surfaces include, but are not limited to, a human body, a window, or a transparent LCD.

Figure 2:
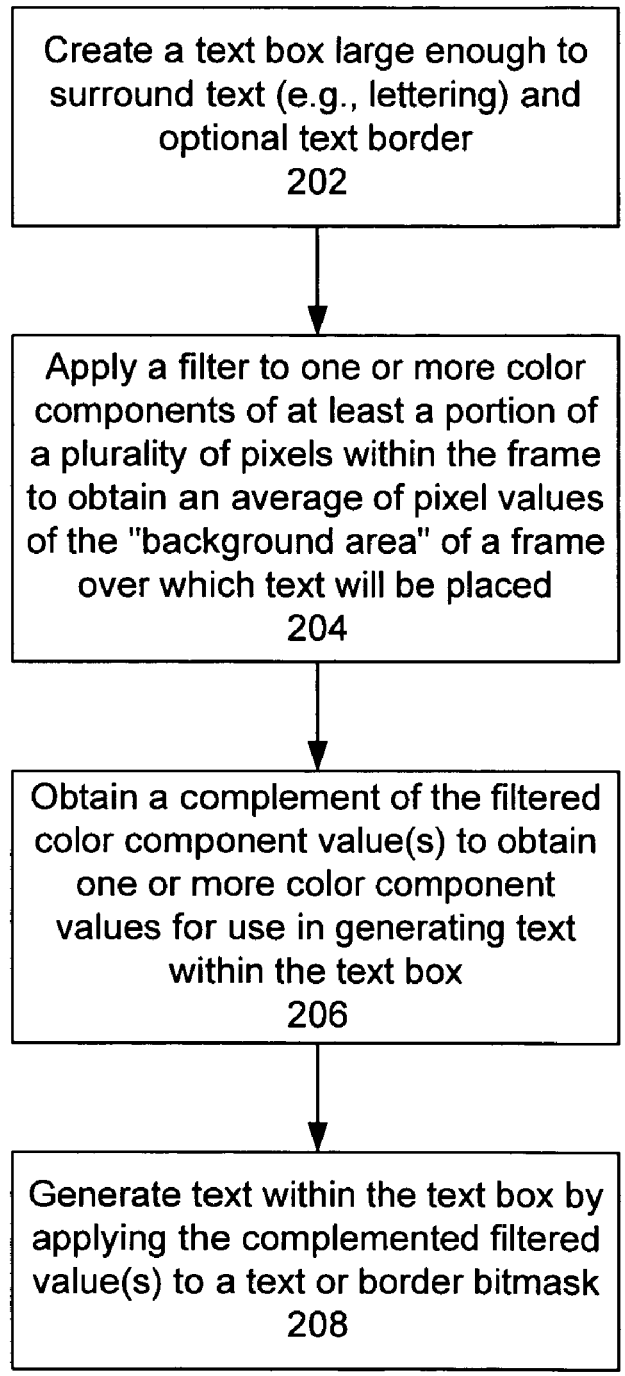
FIG. 2 is a process flow diagram illustrating a first method of generating lettering in accordance with various embodiments of the invention.

FIG. 2 is a process flow diagram illustrating a first method of generating lettering in accordance with various embodiments of the invention. First, a text box large enough to surround text (e.g., lettering) and an optional text border is created at block 202. The text box preferably surrounds all of the pixels of the text that will be generated. If the text is to include a border surrounding the text, the text box may be sized to the width of approximately the sum of the size of the text and two times the pixel width of the specified border. The size of the text and the border may be selectable as parameters to the disclosed processes. Thus, the text box area defines an area within a frame within which text is to be generated, where the text includes an optional text border surrounding and adjacent to the text.

A filter is then applied to one or more color components of at least a portion of a plurality of pixels within the frame at block 204, resulting in an average of color component values for pixels of the "background area" of the frame over which the text will be placed. Thus, filtering is a process that transforms the pixel information for selected pixels to produce generalized or averaged information on the background (e.g., of a text box area) of a frame. This filtering process can be performed on one or more color components (e.g., Y, Cr and Cb) of a set of color components, separately or as a set of color components. For instance, an average Y value over the selected sampled pixels may be ascertained. Various filtering techniques will be described in further detail below with reference to FIG. 4 and FIG. 5.

In order to make the text highly visible against the background, a complement of the "filtered" value(s) is obtained or computed. Specifically, a complement of each of the filtered color component value(s) is then obtained to obtain one or more color component values for use in generating text within the text box at block 206. The term "complement" will be used generally to mean substantially to maximally different from the value being complemented. For example, under some complementing schemes, a Y value of less than 0.5 would receive a complemented Y value of 1, while a Y value of greater than or equal to 0.5 would receive a complemented Y value of 0. Thus, an intensity Y that is at the opposite or near opposite end of the spectrum from the current pixel Y value may be obtained. In this manner, the text and/or associated text border will have an intensity that will be significantly higher (or lower) than that of surrounding pixel values, thereby increasing the contrast between the text and surrounding pixels. By choosing Cr and Cb to be 0.5, the resulting lettering would be either black, white, or a shade of grey. If color is desired for better letter differentiation from the background, then if Cr or Cb is near 0.5, then either extreme of each will produce a greater contrast. It is important to note that it may be desirable to limit the contrast, since an extreme contrast may produce lettering that is perceived as harsh to the viewer. Various techniques for obtaining a complemented value of the filtered color component value(s) will be described in further detail below with reference to FIGS. 5 and 6.

Text is then generated within the text box by applying the complemented filtered value(s) for the one or more color components as shown at block 208. For instance, the complemented filtered value(s) may be applied to a text or border bitmask. Specifically, the complemented filtered value(s) may be applied to the text. When a border is desired, the complemented filtered value(s) are preferably applied to the text border, while the text will be generated according to a selected, preferred or default color. Various methods of generating text will be described in further detail below with reference to FIG. 7 and FIG. 8.

Figure 3:
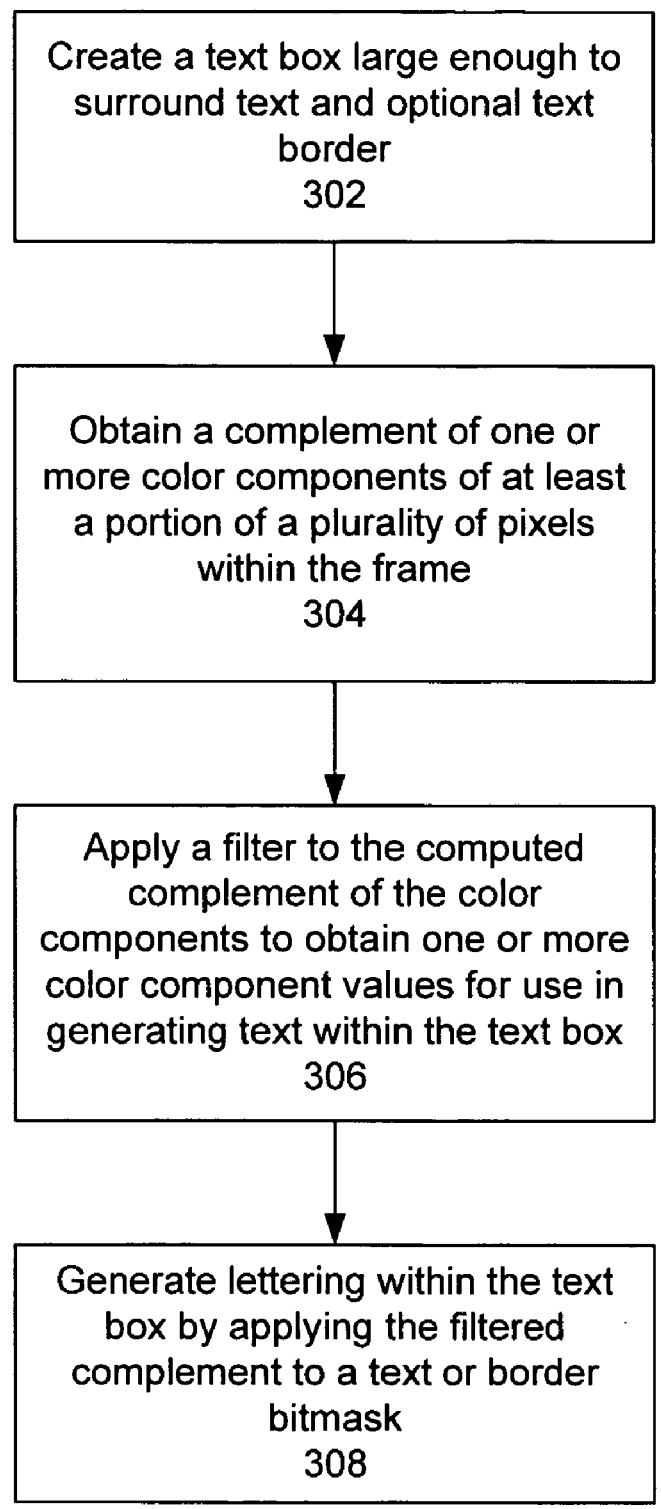
FIG. 3 is a process flow diagram illustrating a second modified method of generating lettering in accordance with various embodiments of the invention.

FIG. 3 is a process flow diagram illustrating a second modified method of generating lettering in accordance with various embodiments of the invention. In this embodiment, the complement is obtained prior to performing filtering, in contrast to the method of FIG. 2 which is performed in the reverse order. Thus, a text box large enough to surround, text and an optional text border is created at block 302. A complemented value for one or more color components for at least a portion of a plurality of pixels within the frame is then obtained at block 304. In other words, a complemented value may be ascertained on a local level individually for selected pixels, representing a complement of background color component values for those pixels. A filter is then applied at block 306 to the obtained complemented value of the color components to obtain an average complemented value for one or more color component values for use in generating text within the text box. Text is then generated within the text box by applying the filtered complemented value(s) for the one or more color components as shown at block 308. For instance, the filtered complemented value(s) may be applied to a border bitmask, but may also be applied to a text bitmask. Where a border is generated, the letter color (e.g., color component value(s)) is generally specified, but may also be a default or computed value.

The methods described herein may be performed globally, thereby including a large area of pixels such as all pixels within the text box area (and/or pixels outside the text box area). For instance, full text box averaging may be performed over the entire text box area. Alternatively, the methods may be performed locally. As one example, pixels neighboring the text box area may be sampled (e.g., where the pixels are in a range of up to n pixels away from the text box area). Similarly, the pixels that are sampled may neighbor only a segment of the text box area in which the text and/or text border surrounding the text is to be placed. For instance, the pixels sampled may be pixels that are up to n pixels away from the segment of the text box area in which text (e.g., a letter or portion thereof) is to be placed. Thus, it is important to note that averaging may be performed on a letter-by-letter basis, or even be performed within a single letter. As a result, the complemented values that will be used may be used throughout the text and/or text border, or may vary throughout the text and/or border (or portion thereof). The number n may be a default value, or user-specified parameter. It is also important to note that the value for n may exceed the limits of the text box area, if desired.

Regardless of whether the sampling method is global or local, the pixels within the frame that are sampled may include pixels within the text box area and/or include pixels outside the text box area. Moreover, the pixels may include or exclude pixels in locations of the text box area of the frame where text or an associated border will be generated. In other words, it is unnecessary to sample pixels where the text or border will be generated, since these areas will be covered by text (or associated text border). However, it may be difficult or computation intensive to exclude these specific pixels in the sampling process. It is also important to note that the pixel information (e.g., color components) under the letters will most likely not be substantially different than the pixel information around the letters.

It may be desirable in various instances to perform boundary filtering. Specifically, where a text border surrounding and adjacent to the text is generated, it may be desirable to primarily or solely sample pixels outside an area of the text box in which the text border is to be generated. In this manner, the color component values to be used in generating the text border may be ascertained.

As described above with reference to block 204 of FIG. 2 and block 306 of FIG. 3, a filter is applied to one or more color components of selected pixels in the background area of the frame over which the text is to be placed. Various additional exemplary filtering techniques will be described with reference to FIG. 4 and FIG. 5. It is important to note that various filtering techniques such as those disclosed may be used individually or in combination with one another.

Figure 4:
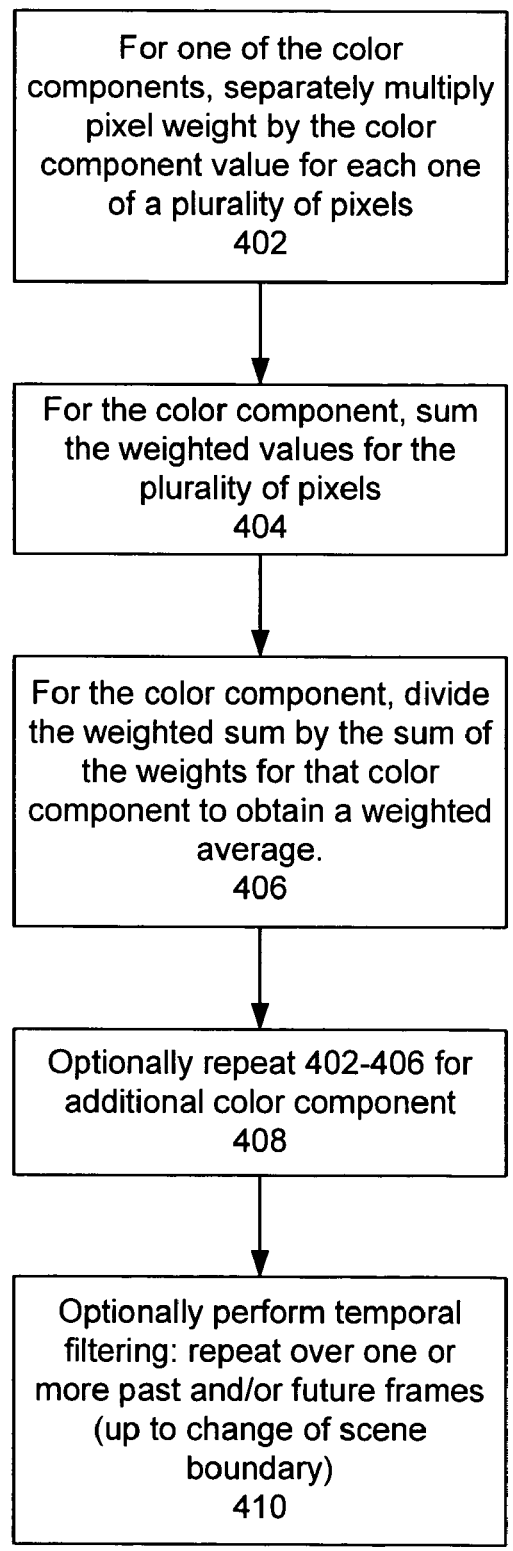
FIG. 4 is a process flow diagram illustrating a method of applying a filter to one or more color component values as shown at block 204 of FIG. 2 or one or more complemented color component values as shown at block 306 of FIG. 3.

FIG. 4 is a process flow diagram illustrating a method of applying a filter to one or more color component values as shown at block 204 of FIG. 2 or one or more complemented color component values as shown at block 306 of FIG. 3. As described above, an average value for one or more color components is obtained over a set of pixels. In this example, each pixel is assigned a pixel weight. For instance, the pixel weight may represent its proximity to locations in which text and/or an associated border may be placed. In other words, a pixel weight may be high (e.g., greater than 0.5 or close to 1) in the center line or middle of the text box area in locations where the text and/or text border are to be generated, while the pixel weights may decrease as the distance from the center line or middle of the text box area increases.

As shown at block 402, for one of the color components, a pixel weight is multiplied by the color component value for each one of the set of pixels. The weighted values for the set of pixels are then summed at block 404 for the color component. The weighted sum for the color component is then divided by the sum of the weights for that color component to obtain a weighted average at block 406. Steps 402-406 may then be repeated for one or more additional color components at block 408. Temporal filtering may then be performed at block 410, such as for dynamic material (e.g., movies or real-time processing). Specifically, the filtering (e.g., averaging) process may be performed over a number of frames rather than for a single frame. These frames may include one or more past and/or future frames, in addition to a current frame. For instance, in order to generate subtitles in a movie, the sampling may be performed over past as well as future frames (up to change of scene boundary). However, only past or present frames may be used to generate text for use in real-time displays such as heads up displays, since future frames are not available.

In the filtering method described above with reference to FIG. 4, the weighted average of selected pixels is computed. As one example, the filter may be performed over neighboring pixels, which may also include the pixels where text is to be generated. As another example, the filter may be performed over neighboring pixels up to n pixels away from where text (and/or associated border) are to be generated, which may include pixels where the text and/or border are to be generated. This method may be performed for each color component (e.g., Y, Cr and Cb).

Figures 5, 6:
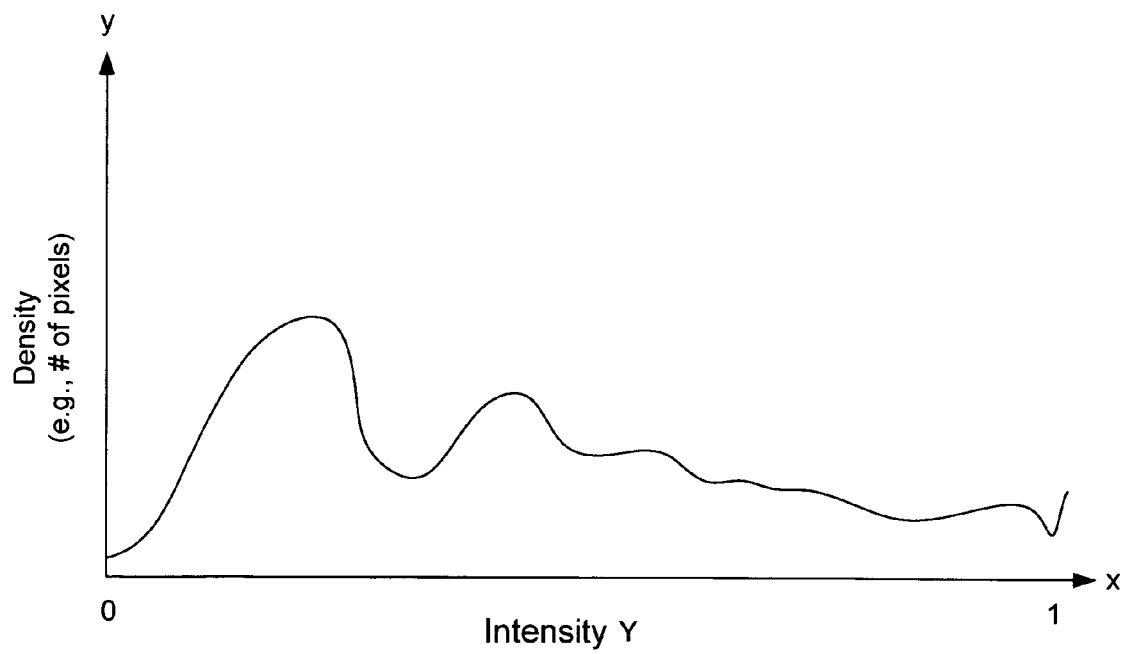
FIG. 5 is a diagram illustrating a exemplary histogram to be used in applying a filter as shown at block 204 of FIG. 2 in order to obtain a complemented value as shown at block 206 of FIG. 2.
FIG. 6 is a diagram illustrating an exemplary table used to obtain complemented component values as shown at block 206 of FIG. 2 or block 304 of FIG. 3.

FIG. 5 is a diagram illustrating a exemplary histogram to be used in applying a filter as shown at block 204 of FIG. 2 in order to obtain a complemented value as shown at block 206 of FIG. 2. In other words, an effective filtered complemented value may be obtained. Specifically, spectral filtering may be performed in order to ascertain the spectral density of color component values (e.g., Y, Cr and/or Cb) over selected pixels (e.g., pixels within the text box area). As shown in FIG. 5, a histogram of each Y value between 0 and 1 over a text box area within a frame is illustrated. (It is important to note that additional separate histograms may be obtained for the additional color components (e.g., Cr and Cb), which may be displayed separately or overlay one another). From this histogram, it is possible to ascertain the spectral density of each Y color component value. As shown, the range of values for the color component intensity, Y, are presented along the x-axis, while the density for each of those values is presented along the y-axis. The density may include, for example, the number of pixels in the text box area of the frame that have that particular Y value. In other words, it is possible to determine a region of the spectrum that is least used (or most used). A specific value within this region that is least used is then used as the complemented value for purposes of text and/or border generation. Alternatively, a complement of the value (or range of values) that is most used may be ascertained in accordance with methods described below.

In accordance with one embodiment, it is possible to maximize the contrast between the lettering and the background by finding a portion of the spectrum (e.g., a range of values for each color component) that is least used over a span of an interval (e.g., [0,1]). In particular, a parameter may be specified or defaulted to that specifies an interval that is a fraction of the interval [0,1]. This interval is then slid from 0 to 1 in order to ascertain a range of values that is least used. Specifically, at each discrete step three separate summations are made of the Y, Cr and Cb density values, respectively (e.g., from three separate histograms). For instance, as shown in FIG. 5, between the interval 0 and 0.1, the density values represented by the y-axis as represented in the histogram are summed to represent a total density within that particular intensity value range. The minima of these summations are chosen for the resultant letter or boundary Y, Cr and Cb value ranges. One of these intensity values is then selected. For instance, the center of the sliding interval of the desired value range may determine the respective value. In the case of black or white lettering, the Cr and Cb values are set to 0.5 for the lettering and/or letter border, while the Y value is determined as described above.

FIG. 6 is a diagram illustrating an exemplary table used to obtain complemented component values as shown at block 206 of FIG. 2 or block 304 of FIG. 3. As shown, the table is a look up table including a plurality of entries. Each of the entries specifies a complemented value corresponding to a range of average values for one or more of the set of color components. In this example, various combinations of intensity and/or color component values or value ranges are presented in selected table entries. A corresponding complemented value for one or more color components may then be ascertained by obtaining the appropriate entry. For instance, it may be possible to find complemented values for Y, Cr, and/or Cb. Alternatively, a variety of formulas may be used to obtain complemented color component values.

Various methods of generating text will be described in further detail below with reference to FIG. 7 and FIG. 8. Text (with or without an associated border) may be generated in a variety of ways. In accordance with one embodiment, the text and/or associated border are generated through the use of one or more bitmasks. Specifically, a bitmask is a mask comprising 1s and 0s, where 1s are generally used to refer to locations in which text or a border is to be generated, while 0s are generally used to refer to locations where the background remains unmodified. In other words, a text and/or border bitmask are applied to an original frame. In each location where a 1 appears, the text and/or border pixel values would overlay the original pixel material.

Figure 7:
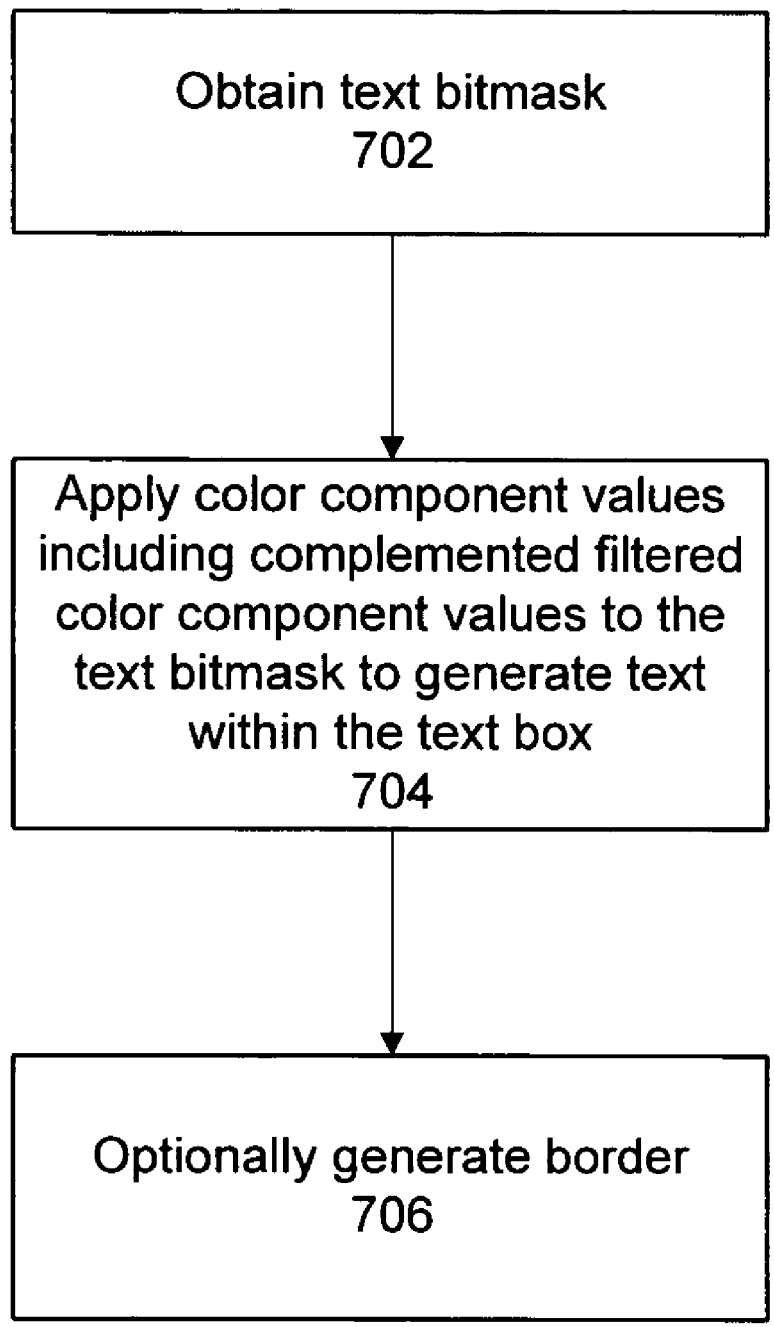
FIG. 7 is a process flow diagram illustrating a method of generating text without bordering as shown at block 208 of FIG. 2 and block 308 of FIG. 3.
Figure 8:
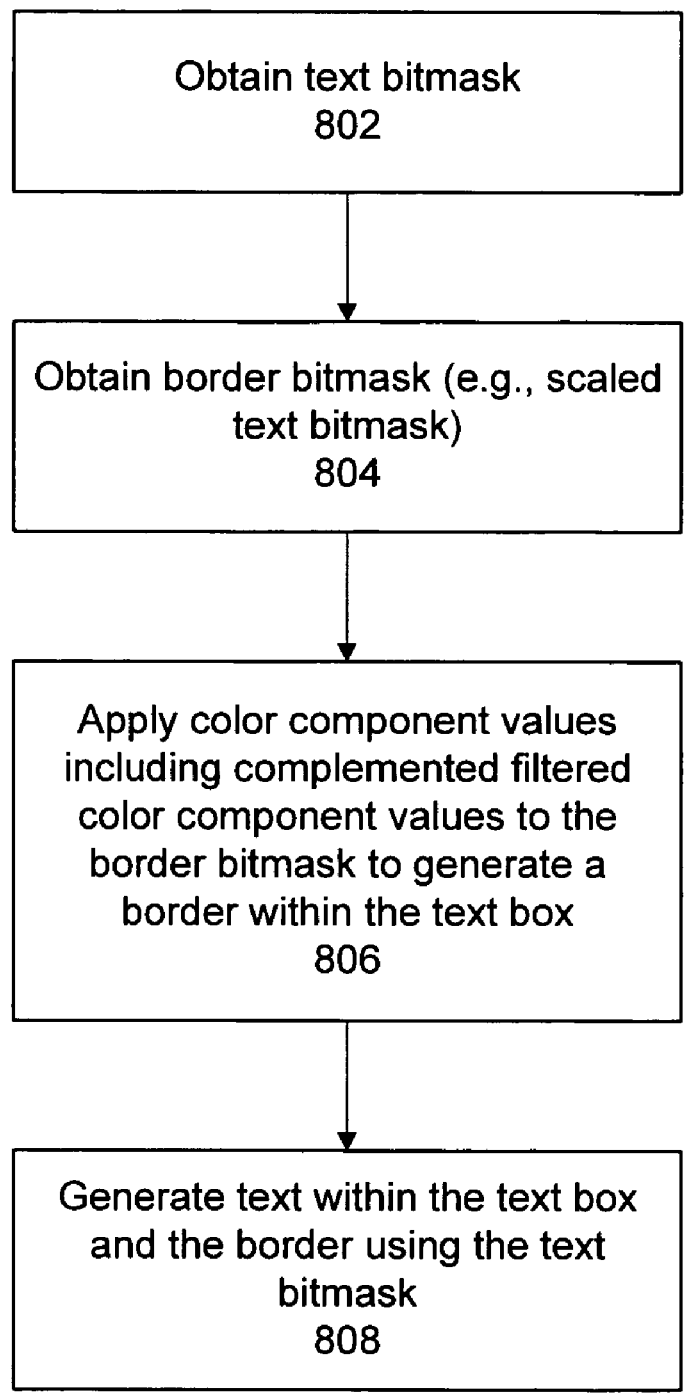
FIG. 8 is a process flow diagram illustrating a method of generating text with bordering as shown at block 208 of FIG. 2 and block 308 of FIG. 3.

FIG. 7 is a process flow diagram illustrating a method of generating text without bordering as shown at block 208 of FIG. 2 and block 308 of FIG. 3. First, a text bitmask is obtained at block 702. The text bitmask represents text locations as 1s, while background areas are represented as 1s. The text bitmask may be obtained using an opacity (i.e., alpha) map that maps the opacity of the text on a normalized scale along the interval [0,1] where 0 represents total transparency (allowing the background to be visible) and 1 represents total opacity (allowing only the text to be visible). Color component values including complemented filtered color component values are then applied to the text bitmask to generate text within the text box area at block 704. In other words, the color component values will be represented at locations of is in the text bitmask. A border is optionally generated (e.g., using a border bitmask) at block 706.

While it may be desirable to generate simple text against a background, it may be desirable to generate a text border for greater contrast. FIG. 8 is a process flow diagram illustrating a method of generating text with bordering as shown at block 208 of FIG. 2 and block 308 of FIG. 3. A text bitmask is obtained at block 802. In addition, a border bitmask is obtained at block 804. The border bitmask may be generated as a separate bitmask, where the border bitmask surrounds the text bitmask and is adjacent to the bitmask, preferably with no intervening pixels. As described above, the size of the text and the border may be selectable. Moreover, the border bitmask may be obtained by scaling the text bitmask, such as by multiplying the text bitmask by a scale factor and/or translating the text bitmask in the plane of the image. For instance, an oversized text bitmask may be generated by obtaining the text (e.g., lettering), which has an associated font size and/or style (specified as a default value or user-specified). From this information, a border parameter may be computed (or obtained) in order to ascertain the amount that the original text bitmask is to be scaled. Specifically, the oversized text mask may be merged with the original text bitmask by moving the oversized text mask in relation to the text bit mask a specified number of pixels as specified by the border parameter. This merging would be repeated by moving the oversized text mask left and down, right and down, right and up, and left and up.

Once a border bitmask is generated or obtained, color component values including complemented color component values (e.g., complemented filtered color component values) are then applied to the border bitmask at block 806 to generate a border within the text box. In other words, the complementary pixel values would overlay the frame as indicated by the 1s in the border bitmask. The color component values will be represented at locations of 1s in the border bitmask. As described above, the border is adjacent to and surrounds the text. In addition, text is generated at block 808 within the text box and the border using the text bitmask. Thus, the original lettering would be displayed under the control of the original text bitmask to produce the final frame.

In the above-described embodiments, the color component value(s) are obtained in order to alter the text or border that is displayed. However, it is also possible to alter the background image in the frame in which a text and/or border that is displayed. Thus, two different mechanisms may be used in order to increase the contrast between text and an underlying image.

Figure 9:
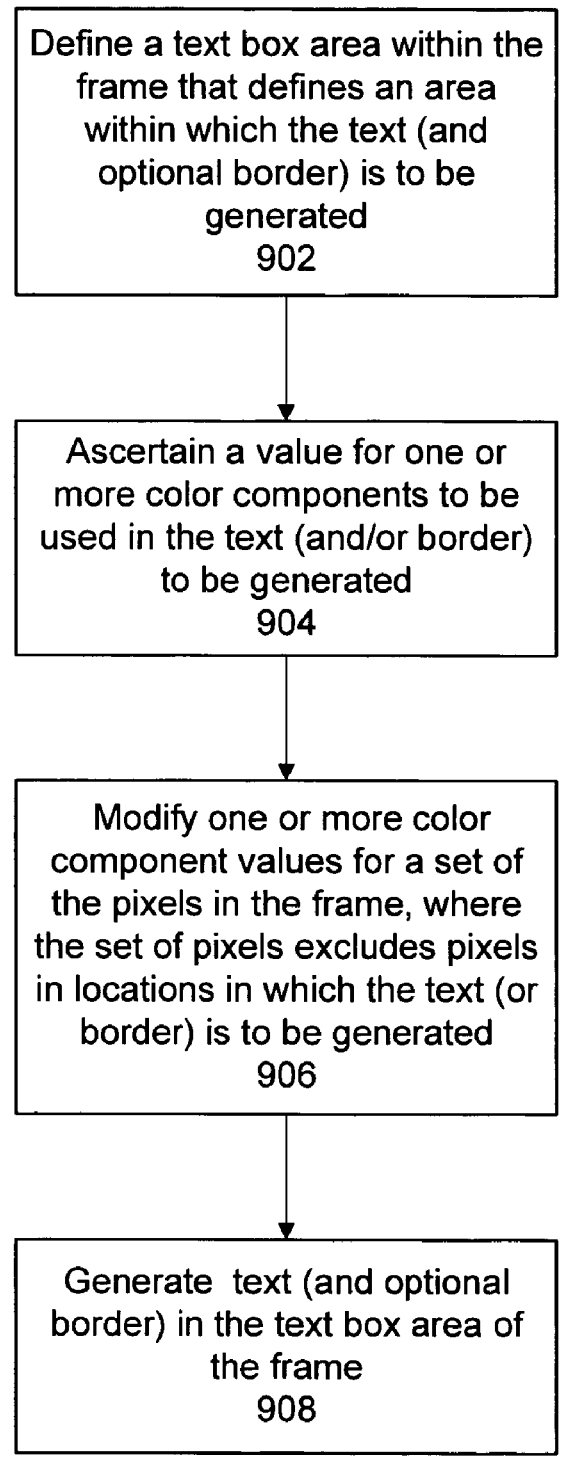
FIG. 9 is a process flow diagram illustrating a third method of generating lettering in accordance with various embodiments of the invention.

FIG. 9 is a process flow diagram illustrating a third method of generating lettering in accordance with various embodiments of the invention in which the background image is altered in order to increase the contrast between the text and the background image. As described above, a text box area within the frame that defines an area within which the text is to be generated is defined at 902. As shown at block 904, the color and/or intensity of the text and/or associated border are determined. These values may be default as well as user-specified values. In this manner, a value for one or more color components to be used in the text (and/or border) to be generated are ascertained. Pixels in the background area of the frame are then modified at block 906. Specifically, one or more color component values for a set of the pixels in the frame are modified, where the set of pixels excludes pixels in locations in which the text (or border) is to be generated. The text (and optional border) are then generated in the text box area of the frame at block 908. In this manner, standard text (e.g., black or white text) may be contrasted by altering the image in the frame.

In modifying the background image of a frame, it may be desirable to provide varying degrees of contrast within the background image. This may be accomplished in a variety of manners. However, two different mechanisms for modulating the intensity (or color component value(s)) will be described. The first mechanism will be referred to as proximity fade or darkening, and the second mechanism will be referred to as vertical fade or darkening.

Proximity fade or darkening includes increasing the amount that one or more of the color component values (e.g., Y value) are modified as proximity to the locations in which the text is to be generated increases, and decreasing the amount that the color component value(s) are modified as proximity to the locations in which the text is to be generated decreases. For instance, if text including black letters is to be displayed on dark background material or white letters is to be displayed on light background material, it is possible to alter the intensity of the background to sharpen the contrast around the letters. However, this modification may gradually increase with proximity to the lettering so that there is no sharp delineation in the background content. Thus, dark background material would be lightened as proximity to the black text characters increases, and light background material would be darkened as proximity to the white text characters decreases. This background intensity modulation would preferably be smoothed over many frames in dynamic material to prevent the image from having an intensity flutter in the affected area.

Vertical fade or darkening includes increasing the amount that one or more of the color component values are modified as proximity to the text increases in a vertical direction from the text, and decreasing the amount that one or more of the color component values are modified as proximity to the text decreases in a vertical direction from the text. In other words, the intensity modulation is the same value in the horizontal direction, and only changes in the vertical direction.

Figure 10:
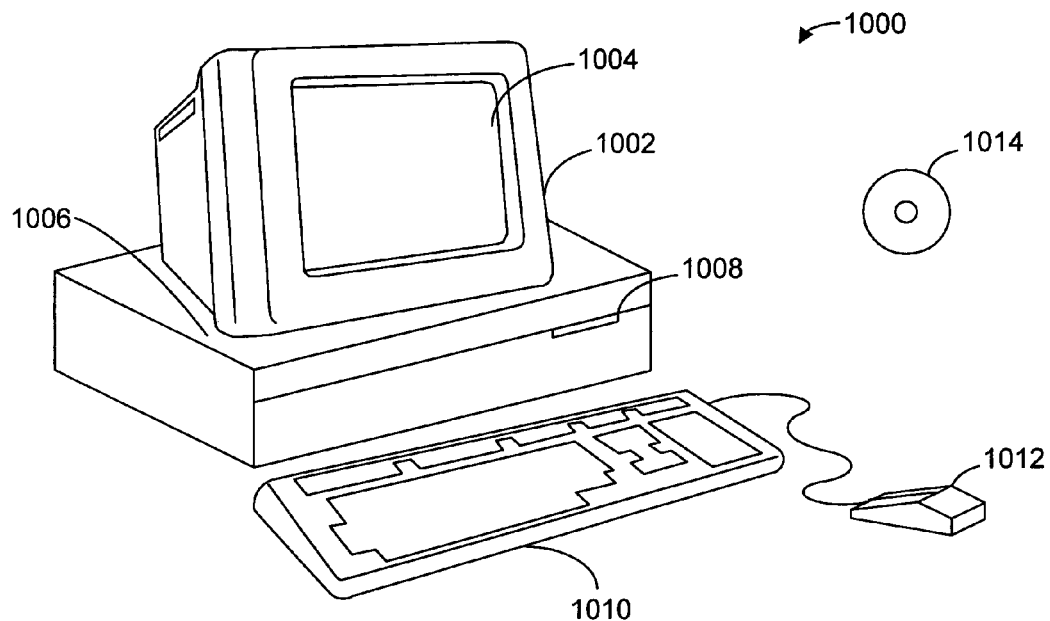
FIGS. 10 and 11 together illustrate a computer system suitable for implementing embodiments of the present invention.
Figure 11:
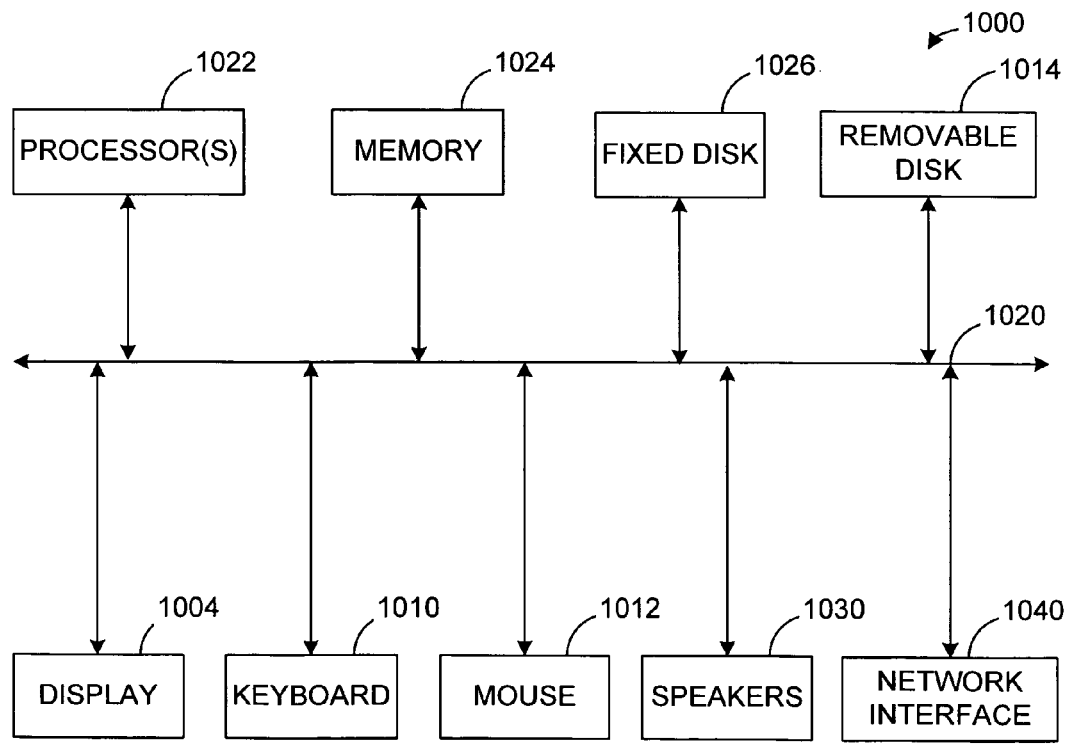

FIGS. 10 and 11 illustrate a computer system 1000 suitable for implementing embodiments of the present invention. FIG. 10 shows one possible physical form of the computer system. Of course, the computer system may have many physical forms ranging from an integrated circuit, a printed circuit board and a small handheld device up to a huge super computer. Computer system 1000 includes a monitor 1002, a display 1004, a housing 1006, a disk drive 1008, a keyboard 1010 and a mouse 1012. Disk 1014 is a computer-readable medium used to transfer data to and from computer system 1000.

FIG. 11 is an example of a block diagram for computer system 1000. Attached to system bus 1020 are a wide variety of subsystems. Processor(s) 1022 (also referred to as central processing units, or CPUs) are coupled to storage devices including memory 1024. In one embodiment, the processor(s) 1022 can be a VLIW processor. Memory 1024 includes random access memory (RAM) and read-only memory (ROM). As is well known in the art, ROM acts to transfer data and instructions uni-directionally to the CPU 1022 and RAM is used typically to transfer data and instructions in a bi-directional manner. Both of these types of memories may include any suitable of the computer-readable media described below. A fixed disk 1026 is also coupled bi-directionally to CPU 1022; it provides additional data storage capacity and may also include any of the computer-readable media described below. Fixed disk 1026 may be used to store programs, data and the like and is typically a secondary storage medium (such as a hard disk) that is slower than primary storage. It will be appreciated that the information retained within fixed disk 1026, may, in appropriate cases, be incorporated in standard fashion as virtual memory in memory 1024. Removable disk 1014 may take the form of any of the computer-readable media described below.

CPU 1022 is also coupled to a variety of input/output devices such as display 1004, keyboard 1010, mouse 1012 and speakers 1030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1022 optionally may be coupled to another computer or telecommunications network using network interface 1040. With such a network interface, it is contemplated that the CPU might receive information from the network, or might output information to the network in the course of performing the above-described method steps. Furthermore, method embodiments of the present invention may execute solely upon CPU 1022 or may execute over a network such as the Internet in conjunction with a remote CPU that shares a portion of the processing.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A computer-implemented method performed by a computing system having a processor for generating text within a frame including a plurality of pixels, each of the pixels being defined by a set of color components, comprising:

by the processor:
defining an area within the frame that defines an area within which the text is to be generated;
ascertaining a value in a value range that is least used for one or more of the set of color components for a set of the plurality of pixels not corresponding to the text to be generated but in the area which the text is to be generated, such that the value is a minimally used value for the one or more of the set of color components, the value being obtained for each of the one or more of the set of color components for the set of the plurality of pixels within the area which the text is to be generated; and
generating the text within the defined area by changing the set of color components for only the pixels in the defined area corresponding to the text to the value for the one or more of the set of color components regardless of the original color components of the pixels corresponding to the text.

2. The computer-implemented method as recited in claim 1, further comprising:
selecting a value from the value range.

3. The computer-implemented method as recited in claim 2, wherein the value is in the middle of the value range.

4. The computer-implemented method as recited in claim 1, wherein ascertaining a value for one or more of the set of color components for a set of the plurality of pixels that is the minimally used value comprises:
ascertaining at least one value for one or more of the set of color components that is a most used value; and
determining a complement of the at least one value.

5. A computing system, comprising:
a display arranged for presenting text within a frame that includes a plurality of pixels each of which is defined by a set of color components;
a processor coupled to the display; and
a memory, at least one of the processor and the memory being adapted for:
defining an area within the frame that defines an area within which the text is to be generated,
ascertaining a value in a value range that is least used for one or more of the set of color components for a set of the plurality of pixels not corresponding to the text to be generated but in the area which the text is to be generated, such that the value is a minimally used value for the one or more of the set of color components, the value being obtained for each of the one or more of the set of color components for the set of the plurality of pixels within the area which the text is to be generated, and
generating the text within the defined area by changing the set of color components for only the pixels in the defined area corresponding to the text to the value for the one or more of the set of color components regardless of the original color components of the pixels corresponding to the text.

6. The computing system as recited in claim 5, wherein the frame is a video frame.

7. The computing system as recited in claim 6, wherein the video frame is one of a plurality of associated video frames that form a video.

8. The computing system as recited in claim 5, wherein the ascertaining a value for one or more of the set of color components includes determining a value range that is least used for the one or more of the set of color components.

9. The computing system as recited in claim 8, further comprising:
selecting a value from the value range.

10. The computing system as recited in claim 9, wherein the value is in the middle of the value range.

11. The computing system as recited in claim 5, wherein ascertaining a value for one or more of the set of color components for a set of the plurality of pixels that is the minimally used value comprises:
ascertaining at least one value for one or more of the set of color components that is a most used value; and
determining a complement of the at least one value.

12. A computer readable storage medium storing at least executable computer program code for generating text within a frame including a plurality of pixels, each of the pixels being defined by a set of color components, the computer readable medium comprising:

executable computer program code for defining an area within the frame that defines an area within which the text is to be generated;

executable computer program code for ascertaining a value in a value range that is least used for one or more of the set of color components for a set of the plurality of pixels not corresponding to the text to be generated but in the area which the text is to be generated, such that the value is a minimally used value for the one or more of the set of color components, the value being obtained for each of the one or more of the set of color components for the set of the plurality of pixels within the area which the text is to be generated; and executable computer program code for generating the text within the defined area by changing the set of color components for only the pixels in the defined area corresponding to the text to the value for the one or more of the set of color components regardless of the original color components of the pixels corresponding to the text.

13. The computer readable storage medium as recited in claim 12, further comprising:

computer program code selecting a value from the value range.

14. The computer readable storage medium as recited in claim 13, wherein the value is in the middle of the value range.

15. The computer readable storage medium as recited in claim 12, wherein ascertaining a value for one or more of the set of color components for a set of the plurality of pixels that is the minimally used value comprises:

computer program code ascertaining at least one value for one or more of the set of color components that is a most used value; and computer program code determining a complement of the at least one value.

\* \* \* \* \*

UNITED STATES PATENT AND TRADEMARK OFFICE
CERTIFICATE OF CORRECTION

| | | |
|---|---|---|
| PATENT NO. | : 7,796,139 B1 | Page 1 of 1 |
| APPLICATION NO. | : 11/054890 | |
| DATED | : September 14, 2010 | |
| INVENTOR(S) | : Gary F. Feierbach et al. | |

It is certified that error appears in the above-identified patent and that said Letters Patent is hereby corrected as shown below:

In column 9, line 13, delete "represented as 1s." and insert -- represented as 0s. --, therefor.

Signed and Sealed this
Twenty-ninth Day of November, 2011

David J. Kappos
*Director of the United States Patent and Trademark Office*